United States Patent
Recht

(10) Patent No.: US 7,460,732 B2
(45) Date of Patent: Dec. 2, 2008

(54) METHOD AND SYSTEM FOR OBJECT RECOGNITION USING FRACTAL MAPS

(75) Inventor: Joel Recht, Monsey, NY (US)

(73) Assignee: Ikonisys, Inc., New Haven, CT (US)

( * ) Notice: Subject to any disclaimer, the term of this patent is extended or adjusted under 35 U.S.C. 154(b) by 0 days.

(21) Appl. No.: 12/028,934

(22) Filed: Feb. 11, 2008

(65) Prior Publication Data

US 2008/0131026 A1   Jun. 5, 2008

Related U.S. Application Data

(63) Continuation of application No. 11/745,245, filed on May 7, 2007, now Pat. No. 7,373,018, which is a continuation of application No. 11/259,432, filed on Oct. 26, 2005, now Pat. No. 7,215,829, and a continuation of application No. 10/368,049, filed on Feb. 14, 2003, now Pat. No. 6,993,187.

(51) Int. Cl.
  *G06K 9/00* (2006.01)
  *G06K 9/36* (2006.01)
(52) U.S. Cl. .......................... 382/291; 382/181
(58) Field of Classification Search ................ 382/173, 382/181, 291
  See application file for complete search history.

(56) References Cited

U.S. PATENT DOCUMENTS

| | | | |
|---|---|---|---|
| 4,823,194 A | 4/1989 | Mishima et al. | |
| 4,872,064 A | 10/1989 | Tutt et al. | |
| 5,054,101 A * | 10/1991 | Prakash | 382/270 |
| 5,444,795 A * | 8/1995 | Tzoganakis | 382/141 |
| 5,485,532 A | 1/1996 | Ishihara | |
| 5,625,705 A | 4/1997 | Recht | |
| 5,638,459 A | 6/1997 | Rosenlof et al. | |
| 5,647,025 A | 7/1997 | Frost et al. | |
| 5,671,294 A | 9/1997 | Rogers | |
| 5,696,700 A | 12/1997 | O'Brian et al. | |
| 5,764,792 A | 6/1998 | Kennealy | |
| 5,787,201 A | 7/1998 | Nelson et al. | |
| 5,790,710 A | 8/1998 | Price et al. | |
| 5,809,169 A | 9/1998 | Rezzouk et al. | |
| 5,848,177 A | 12/1998 | Bauer et al. | |

(Continued)

OTHER PUBLICATIONS

Stubbendieck, et al., "A Fractal Dimension Feature Extraction Technique for Detecting Flaws in Silicon Wafers", Int. Joint. Conf. on Neural Networks, Jun. 7, 1992, pp. 717-723, vol. 3.

(Continued)

*Primary Examiner*—Colin LaRose
(74) *Attorney, Agent, or Firm*—Kelley Drye & Warren LLP

(57) ABSTRACT

A method for recognizing an object in an image is disclosed wherein a fractal map of the image is generated by estimating the fractal dimension of each pixel in the image. The fractal map may be segmented by thresholding and locations of candidate objects are determined. The pixel value of the image pixel corresponding to the same location where the candidate object is found in the fractal map may be compared to a threshold value. If the pixel value is greater than the threshold value, the candidate object is recognized as a valid object.

1 Claim, 6 Drawing Sheets

U.S. PATENT DOCUMENTS

| | | | |
|---|---|---|---|
| 5,859,919 | A | 1/1999 | Holland et al. |
| 6,094,508 | A | 7/2000 | Acharya et al. |
| 6,124,544 | A | 9/2000 | Alexander et al. |
| 6,154,574 | A | 11/2000 | Paik et al. |
| 6,466,687 | B1 * | 10/2002 | Uppaluri et al. ............ 382/128 |
| 2003/0228051 | A1 | 12/2003 | Gleason et al. |
| 2005/0254710 | A1 | 11/2005 | Dioguardi et al. |

OTHER PUBLICATIONS

Russ, "The Image Processing Handbook, 2nd Edition", CRC Press, 1995, pp. 441-457.

Zhang, et al., "Applications of Fractal Modeling to Cell Image Analysis", Proc. IEEE Energy and Info Tech. in the Southeast, Southeastcon '89, 1989, pp. 618-622.

Fortin, et al., "The Use of Fractal Dimension in MR Image Segmentation: A Variance Technique", 12th; Annual Int. Conf. of the IEEE Eng. in Med. and Bio., 1999, pp. 1388-1389.

Fortin, et al., "Fractal Dimension in the Analysis of Medical Images", IEEE Engineering in Medicine and Biology Magazine, Jun. 1992, pp. 65-71, V. 11(2).

Shusterman, et al., "Image Compression via Improved Quadtree Decomposition Algorithms", IEEE Transactions on Image Processing, Mar. 1994, V. 3(2).

Maeda, et al., "Integration of Local Fractal Dimension and Boundary Edge in Segmenting Natural Images", Proc. Int. Conf. on Image Processing, 1996, pp. 845-848, vol. 1.

Liu, et al., "Image Feature Extraction and Segmentation using Fractal Dimension", Int. Conf. on Information Communications and Signal Processing, 1997, pp. 975-979, vol. 2.

Cho, et al., "Effective Image Segmentation of Natural-Noised Image Using Approximate Fractal Dimension", IEEE Int. Conf. on Multimedia and Expo, 2001, pp. 1183-1186.

Castleman, Digital Image Processing, 1996, pp. 447-545, Prentice-Hall.

Mandelbrot, "The Fractal Geometry of Nature", 1982, pp. 166-199, W.H. Freemen, San Francisco.

Vudue, R., "Image Segmentation Using Fractal Dimension", May 1997.

Chaudhuri, B.B., et al., "Texture Segmentation Using Fractal Dimension. Pattern Analysis and Machine Intelligence", IEEE Transactions, Jan. 1995, pp. 72-77, V. 17(1).

Russ, "The Image Processing Handbook, 2.Sup.Nd. Edition", 1995, 99 262-263, CRC Press.

Cho et al., "Effective Image Segmentation of Natural-Noised Image Using Approximate Fractal Dimension," 2001 IEEE International Conference on Multimedia and Expo, pp. 661-664.

* cited by examiner

METHOD AND SYSTEM FOR OBJECT RECOGNITION USING FRACTAL MAPS

CROSS-REFERENCE TO RELATED APPLICATION

This is a continuation application of U.S. patent application Ser. No. 11/745,245, filed May 7, 2007, which is a continuation application of U.S. patent application Ser. No. 11/259,432, filed Oct. 26, 2005, now U.S. Pat. No. 7,215,829 and U.S. patent application Ser. No. 10/368,049, filed Feb. 14, 2003, now U.S. Pat. No. 6,993,187, the entire contents of which are incorporated herein by reference in their entirety.

FIELD OF THE INVENTION

The present invention relates to digital image processing. More specifically, the invention relates to methods for object recognition in an image using both the image and the fractal map of the image.

BACKGROUND OF THE INVENTION

A human can view an image and effortlessly distinguish a face from the background even when the image is of poor quality. Providing this same capability to a computer requires more effort. Distinguishing objects in an image is called pattern recognition and comprises three major steps: isolation; extraction; and classification. The first step, isolation, segments each object in the image. Extraction measures a set of features, such as size or color that characterizes each object. Lastly, classification assigns each object to a class based on the set of measured features of the object. Castleman, Digital Image Processing, pp. 447-546, Prentice-Hall, (1996) describes each of the steps and is herein incorporated by reference.

Thresholding is one method of segmenting an image and has the advantage of being computationally simple. The pixel value of each pixel in the image is compared against a threshold value and assigned a new pixel value depending on whether the original pixel value is greater than or less than the threshold value. Thresholding works well when the object, or target, of interest has a substantially uniform gray level that is significantly different from the gray level of the background.

A common problem in automated image processing systems is that the threshold value required to properly segment the image depends on the quality of the images being processed. Adaptive threshold systems adjust the threshold value according to the image characteristics, but require more computational resources that may make the application cost prohibitive. Alternatively, if the samples are fairly uniform, such as PC boards, and the lighting conditions during image capture are tightly controlled, the threshold value may be set once at the beginning of the automated inspection process.

FIG. 1 is a schematic of an automated scanning optical microscopy system. The automated scanning optical microscopy system 100 includes an optical microscope modified to automatically capture and save images of a sample 105 placed on a sample holder 107 such as, for example, a slide, which in turn is supported by a stage 110. The optical components include an illumination source 120, objective lens 124, and camera 128. Housing 130 supports the optical components. The design and selection of the optical components and housing are known to one of skill in the optical art and do not require further description.

The automated system 100 includes a controller that enables the stage 110 supporting the slide 107 to move a portion of the sample 105 into the focal plane of the objective lens and to translate the stage within the focal plane of the objective lens to allow different portions of the sample to be viewed and captured. The camera 128 captures an image of the sample and sends the image signal to an image processor for further processing and/or storage. In the example, shown in FIG. 1, the image processor and controller are both housed in a single PC 104 although other variations may be used. The mechanical design of the stage 110 is known to one of skill in the mechanical arts and does not require further description.

The controller may also control a sample handling subsystem 160 that automatically transfers a slide 109 between the stage 110 and a storage unit 162. The prepared sample slides are loaded into the storage unit 162 and the storage unit 162 is loaded on the sample handling subsystem 160. The loading of the slides into the storage unit or the loading of the storage unit into the handling subsystem may be done manually by an operator or may be automated. After the handling subsystem is loaded, the operator may enter information describing or identifying the samples into the processor. The operator may also enter or select parameters that govern how the scanning microscopy system will operate during the automated run. For example, the operator may choose to process all of the loaded sample slides in one continuous run or choose to terminate the run after a selected number of slides have been processed. As a further example, the operator may view one or more images captured from the samples and set threshold values such as the ones described below. After the run parameters are entered, the operator starts the run and the processor takes control of the system until the run is completed or terminated by the controller.

The image captured by the camera 128 may be preprocessed before being stored or sent to the image processor. The hardware and basic software components for the capture, storage, retrieval, display, and manipulation of the image are known to one of skill in the art and are not further discussed. The image processor may correct for camera artifacts, enhance particular objects of the image to simplify the object recognition process, or adjust or compensate for the lighting conditions used to capture the image.

In many situations, however, the properties of the sample itself produce images where the pixel values (gray levels) of the background do not differ significantly from the pixel values of the target. For example, epifluorescence microscopy of biological samples usually produces low light signal images because of the low signal strength of the fluorophore used to tag the biological samples. Under low light conditions, the average pixel value of the image is close to zero. A similar situation occurs under low contrast conditions where the difference between the average pixel value of the target and the average pixel value of the background is close to zero. In both conditions, closeness is relative to the maximum pixel value. For example, if the pixel depth is eight bits, the maximum pixel value is 255 and a pixel difference of 16 may be considered close. Similarly, if the pixel depth is 16 bits, the maximum pixel value is 65,535 and a pixel difference of 512 may be considered close. If the threshold is set to the average pixel value when the average value is close to zero, the segmentation will be susceptible to false positives due to background noise.

Therefore, there remains a need for a method of image segmentation that may be used in automated image processing systems that is capable of handling low light/low contrast images.

SUMMARY

One embodiment of the present invention is directed to a method of recognizing an object in a digital image, the method comprising: generating a fractal map of the image; isolating the object by segmenting the fractal map; locating the object on the fractal map; and confirming the object based on a pixel value of a pixel at a corresponding location in the digital image. In some embodiments, the method of segmenting the image further includes applying a threshold to the fractal map, the threshold representing a fractal dimension. In some embodiments, generating the fractal map further includes: forming a plurality of boundary images from the image, each of the plurality of boundary images characterized by a scale; estimating the fractal dimension of at least one pixel of the image from the plurality of boundary images; and setting a pixel in the fractal map corresponding to the location of the at least one pixel of the image a value equal to the estimated fractal dimension of the at least one pixel. In some embodiments, forming the boundary image further includes: eroding the image by an L×L structuring element to form an eroded image; dilating the image by an L×L structuring element to form a dilated image; and forming the boundary image by subtracting the eroded image from the dilated image, the scale of the boundary image defined by L. In some embodiments, generating the fractal map includes estimating a fractal dimension for at least one pixel of the image, the fractal dimension of the pixel given by $$d_p = \frac{\log(N_2/N_1)}{\log(L_2/L_1)}$$

where $d_p$, is the fractal dimension of the at least one pixel of the image, $N_2$ is the sum of the pixel values in an $L_2 \times L_2$ structuring element, $N_1$ is the sum of the pixel values in an $L_1 \times L_1$ structuring element, and $L_2$ and $L_1$ are the sizes (in pixels) of the respective structuring elements.

Another embodiment of the present invention is directed to a system for automatically recognizing an object in a digital image, the system comprising: an image capture sensor for capturing the image, the image comprising at least one pixel, the pixel characterized by a location of the pixel within the image and a pixel value; means for generating a fractal map of the image; means for segmenting the fractal map; means for locating the object on the fractal map; and means for recognizing the object based on a pixel value at a corresponding location in the digital image. In some embodiments, the means for generating the fractal map further comprises means for estimating the fractal dimension of the at least one pixel of the image and assigning the estimated fractal dimension to a pixel value of a pixel in the fractal map corresponding to the location of the at least one pixel of the image. In some embodiments, the means for estimating the fractal dimension further includes: means for applying a first structuring element to the at least one pixel of the image, the first structuring element characterized by a first scale length; and means for applying a second structuring element to the at least one pixel of the image, the second structuring element characterized by a second scale length, wherein the second scale length is greater than the first scale length.

BRIEF DESCRIPTION OF THE DRAWINGS

The invention will be described by reference to the preferred and alternative embodiments thereof in conjunction with the drawings in which.

DETAILED DESCRIPTION OF THE PREFERRED AND ALTERNATIVE EMBODIMENTS

Figure 1:
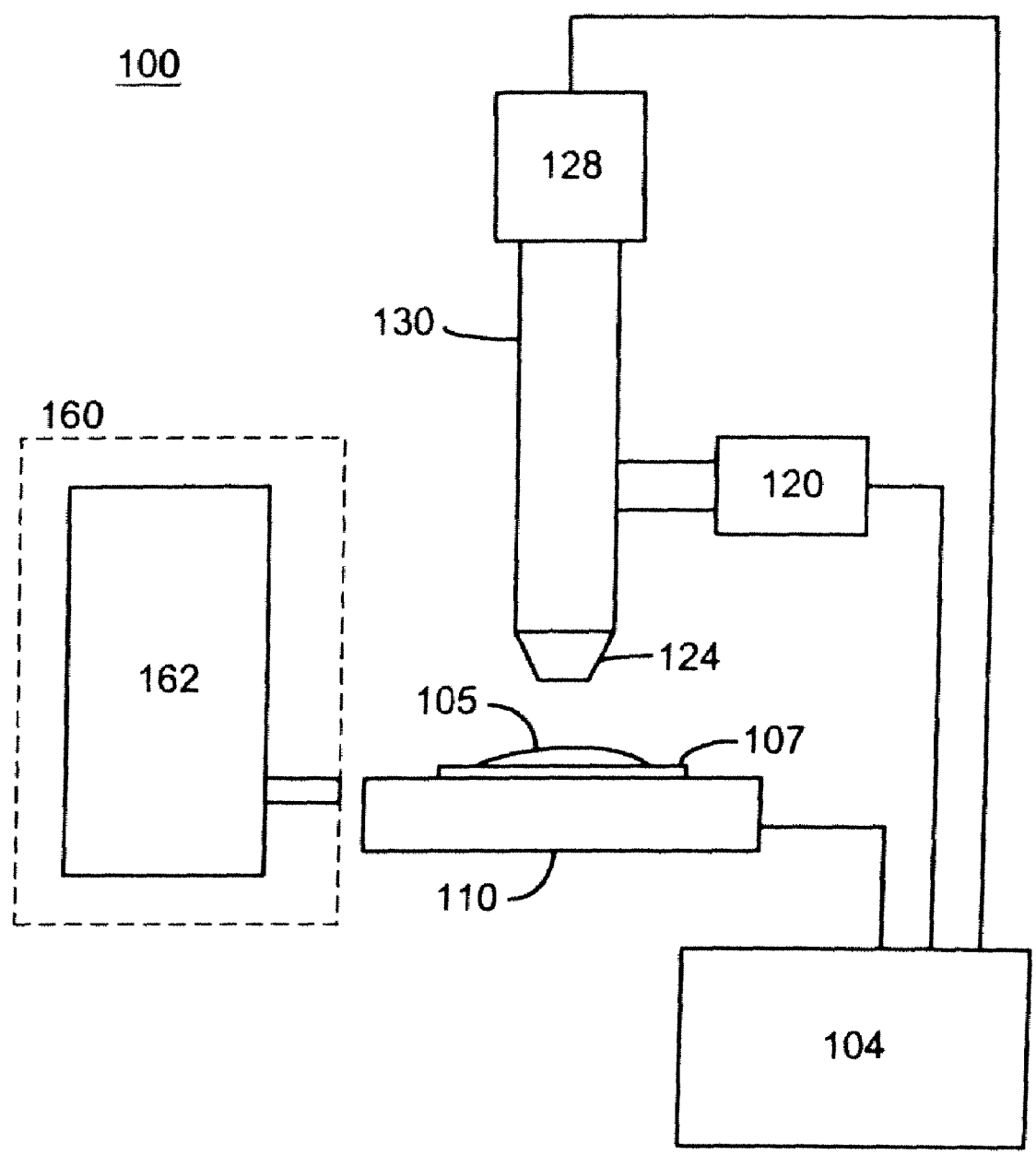
FIG. 1 is a schematic diagram of an automated scanning optical microscopy system.

Low light/low contrast images may be adjusted by mapping the pixel values to a transformed set of pixel values. For the purposes of illustration, suppose an image having a depth of eight bits has pixel values between 0 and 31. The image is a low light image because the greatest pixel value of the image, 31, is much less than the maximum possible pixel value of 255. Histogram equalization maps the pixel values of the original image to pixel values that span the entire pixel depth. In this example, pixels having a pixel value of 31 are given an equalized pixel value of 255, pixels having a pixel value of 16 are given an equalized pixel value of 128, etc. Histogram equalization is a linear mapping, but contrast may be further enhanced by a non-linear transformation such as a power law. One such non-linear transformation is the gamma correction that calculates the corrected pixel value based on the original pixel value raised to a constant, γ.

Both histogram equalization and gamma correction are point transformations in that the transformed pixel value does not depend on the pixel values of the neighboring pixels. Filtering operations such as, for example, smoothing calculate the new pixel value based on the pixel values in the neighborhood of the structuring element. The filtering operation is completed in one sweep through all the pixels in the image using the same sized structuring element or filter kernel. The size of the structuring element determines the extent of sampling of the neighboring pixels. These operations are described in Castleman and do not require further discussion.

In one embodiment of the present invention, a fractal map is generated for each image that allows thresholding for low light/low contrast images without the need for histogram equalization or gamma corrections. Unlike histogram equalization or gamma corrections, the fractal transformation is not a point operation and uses the pixel values of neighboring pixels to calculate the transformed pixel value. Unlike filtering operations, the fractal transformation samples at least two neighborhoods, where each neighborhood is characterized by a different size, or scale.

The fractal map is generated by assigning to each pixel in the image a pixel value that represents the fractal dimension of the pixel. A description of fractals is given in Mandelbrot, The Fractal Geometry of Nature, W. H. Freeman, San Francisco (1982) and is herein incorporated by reference. Mandelbrot uses the fractal dimension to describe self-similar objects such as the Koch curve or fracture surfaces in materials.

The fractal dimension is the exponent in a power law function relating a measurable quantity to a length raised to the exponent, i. e., $$N = p_L d \tag{1}$$

where N is a countable quantity such as the number of pixels defining an edge, p is a density, L is a scale length, and d is the fractal dimension. Although d may be an integer, in most cases d is a non-integer.

Mandelbrot describes one method of determining the fractal dimension of an object by counting the number of covering spheres required to cover the object as a function of the covering sphere size. The fractal dimension of the object is the slope of the number of covering spheres versus covering sphere size when plotted on log axes. If only two sphere sizes are used, the fractal dimension may be estimated by the equation:

$$d = \frac{\log(N_2/N_1)}{\log(L_2/L_1)} \tag{2}$$

where $N_2$ is the number of covering spheres of size $L_2$ required to cover the object and $N_1$ is the number of covering spheres of size $L_1$ required to cover the object.

The fractal dimension, as described by Mandelbrot, is a single number that characterizes the whole object and is therefore global in the sense that it represents the whole object. In a similar fashion, the fractal dimension has been used to characterize fracture surfaces as described in Russ, Handbook of Image Processing 4th ed., pp. 261-263, 694-696, CRC Press, 2002, herein incorporated by reference. In both cases, the fractal dimension is associated with the whole object and is determined once for the object. The fractal dimension may be interpreted as representing a measure of the shape and degree of self-similarity of the object. Assuming this interpretation is correct, then each portion of the object should also have the same fractal dimension as long as the size of the portion lies within the self-similar range of the object. Therefore, a single determination of the fractal dimension of the object should be sufficient to characterize the object.

Figure 2:
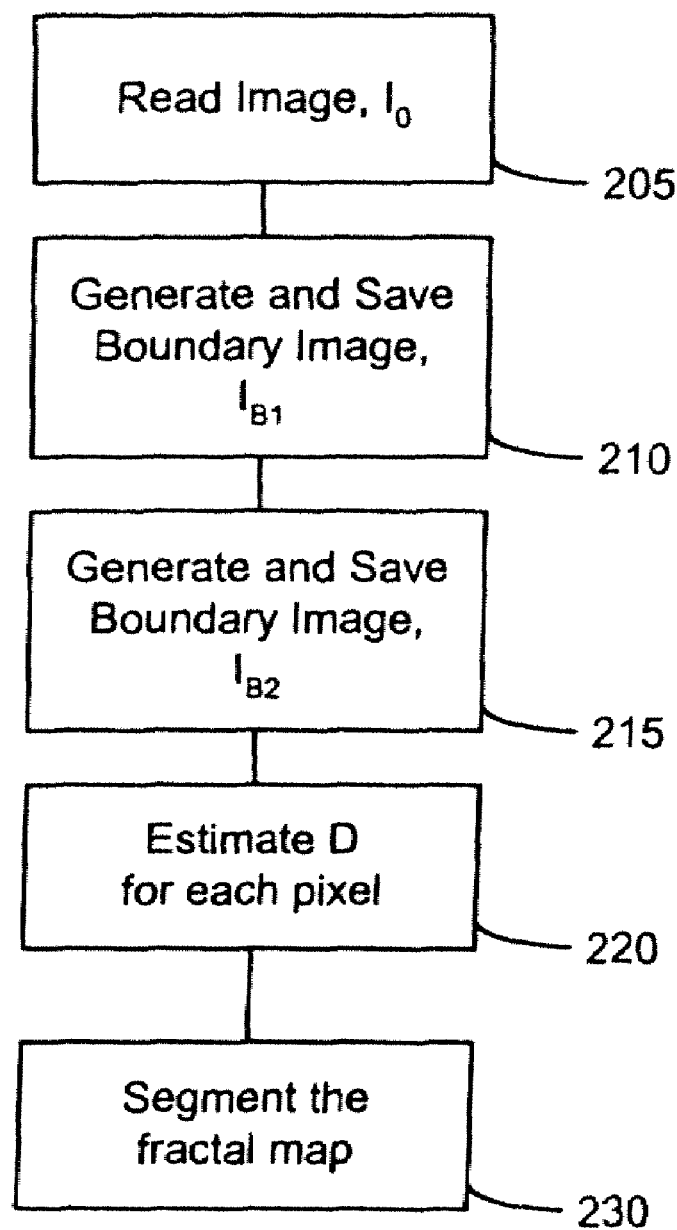
FIG. 2 is a flowchart of an embodiment of the present invention.

The inventor, however, has discovered that when each pixel of an image is assigned a fractal dimension using an equation of the same form as equation (2) but where $N_1$ and $N_2$ are the sums of pixel values instead of the number of pixels, the resulting gray scale fractal map of the image may be segmented simply and accurately even for low light/low contrast images. As used hereinafter, the term fractal dimension refers to the quantity, d, estimated using the equation (2) where $N_1$ and $N_2$ are the sums of pixel values instead of the number of pixels FIG. 2 is a flow diagram of one embodiment of the present invention. An image, $l_0$, is read in step 205. In step 210, a first boundary image, $l_{B1}$, is generated from $l_0$ and stored. A second boundary image, $l_{B2}$, is generated from $l_0$ and stored in step 215.

Figures 3, 4A, 4B:
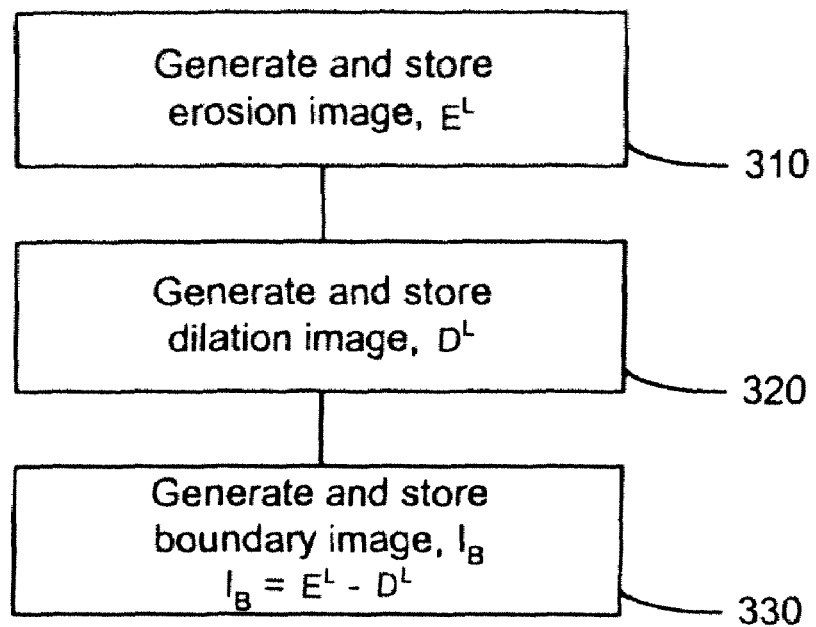
FIG. 3 is a flowchart illustrating the generation of a boundary image in an embodiment of the present invention.
FIG. 4a is a diagram illustrating an L=3 structuring element used in one embodiment of the present invention.
FIG. 4b is a diagram illustrating an L=3 structuring element used in another embodiment of the present invention.

FIG. 3 is a flow diagram illustrating the generation of each boundary image, Is. An erosion image, $E^L$, is generated from the captured image, $l_0$, and stored in step 310. A dilation image, $D^L$, is generated from lo and stored in step 320. In step 330, the boundary image, $l_B$, is generated by subtracting the erosion image from the dilation image, i. e., $l_B = D^L - E^L$. The superscript, L, in $E^L$ and $D^L$ both refer to the size, or scale, of the structuring element used to perform the erosion or dilation, respectively.

The structuring element may be represented by an L×L matrix comprised of ones and zeros. The structuring element is characterized by an origin pixel and a neighborhood. The neighborhood comprises all the matrix elements that are set to one and is contained within the L×L matrix. An image is generated by calculating a pixel value for the pixel at the origin of the structuring element based on the pixel values of the pixels in the neighborhood of the structuring element. In the case of erosion, the pixel value of the origin pixel is set to the minimum of the pixel values in the neighborhood. Dilation, in contrast, sets the pixel value to the maximum of the pixel values in the neighborhood. In one embodiment, the neighborhood is coextensive with the structuring element where the L×L matrix comprised of all ones, as shown in FIG. 4a for an L=3 structuring element. In another embodiment, the neighborhood is less than the structuring element in that the L×L matrix includes at least one zero. In another embodiment, the neighborhood is a "cross" or "plus" centered on the origin of the structuring element, as shown in FIG. 4b for an L=3 structuring element.

Referring to FIG. 2, step 215 generates a second boundary image, $l_{B2}$ at a different scale, $L_2$, using a different size structuring element than the structuring element used to generate $l_{B1}$. The selection of the scale for both boundary images may depend on the size of the object of interest, the computational limitations of the processor, and other such factors as is apparent to one of skill in the art. In one embodiment, $L_1$ and $L_2$ are selected to maximize the difference between $L_1$ and $L_2$ under constraints such as those identified above. In one embodiment, $L_1$ may be chosen from the group consisting of 1, 2, 3, 4, 5, and greater than 5. In a preferred embodiment, the scale of $l_{B1}$ is set to $L_1=3$. $L_2$ is selected such that $L_2$ is greater than $L_1$, or, stated differently, the ratio, $R=L_2/L_1>1$. In one embodiment, R is in the range selected from a group consisting of 1-16, 16-64, 64-128, and greater than 128. In a preferred embodiment, R=85.

The fractal dimension, $d_p$, for each pixel in $l_0$ is estimated from the boundary images $l_{B1}$ and $l_{B2}$ in step 220. The fractal dimension for each pixel may be estimated by the equation (3):

$$d_p = \frac{\log\left(\frac{N_2}{N_1}\right)}{\log\left(\frac{L_2}{L_1}\right)} \tag{3}$$

where $N_2$ represents the sum of the pixel values in the neighborhood of the structuring element centered on the pixel in $l_{B2}$ and $N_1$ represents the sum of the pixel values in the neighborhood of the structuring element centered on the pixel in $l_{B1}$.

The image generated by the set of $d_p$s s is called the fractal map or fractal image. Unlike $l_0$ where the pixel values represent a light intensity for the pixel location in the image, the pixel values in the fractal map represent the fractal dimension for that pixel location in the image.

The form of equation (3) clearly shows that the fractal dimension is estimated by taking ratios of pixel values and therefore should provide a more robust method than histogram equalization or gamma correction for distinguishing objects in low light or low contrast conditions. Furthermore, it is believed that the use of sums in $N_1$ and $N_2$ reduces the statistical variations that may be expected in low light conditions.

The image, $l_0$, is segmented in step 230. In a preferred embodiment, the segmentation of $l_0$ is accomplished by thresholding the fractal map of $l_0$ and using the one-to-one correspondence of a fractal map pixel to the image pixel to segment the image. The threshold value may be set once by an operator prior to an automated run of a batch of samples, or may be dynamically adjusted during the automated run via the techniques described in, for example, Russ. The threshold value may be determined using a calibrated sample or, more preferably, by using a few samples from the batch.

Figure 5:
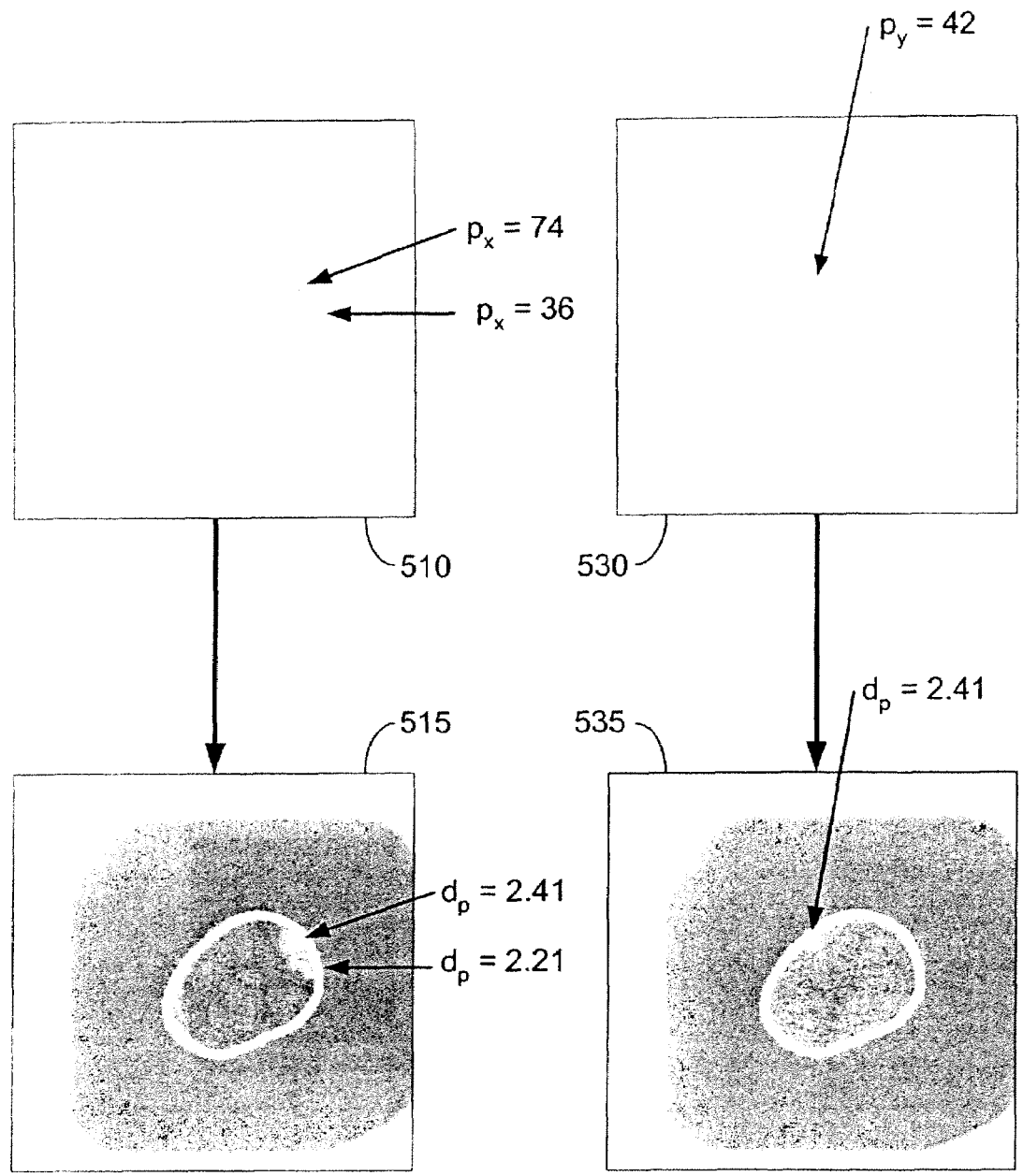
FIG. 5 is an illustrative example showing two images and their fractal maps generated by the embodiment shown in FIG. 2.

FIG. 5 shows enhanced images and their respective fractal maps of a sample and illustrates the ability of the fractal map to distinguish the target of interest. Images 510 and 530 are 256×256×8 images of a male fetal cell in a maternal blood sample. The sample was tagged with probes for the X and Y-chromosomes. Image 510 is obtained using a filter that allows the emission light from the X chromosome probe to pass through to the camera. Image 530 is obtained using a filter that allows the emission light from the Y chromosome probe to pass through to the camera.

Images 510 and 530 have been histogram equalized and gamma corrected in an attempt to visually enhance the quality of the images and allow the viewer to see the relevant objects of the images 510 and 530. In spite of these enhancements, the images still do not clearly display the objects of interest. The maximum pixel value for each image 510 and 530 are indicated in FIG. 5. The X-probe image 510 has a maximum pixel value of 74. The X-probe image 510 also shows a second object, an artifact, having a pixel value of about 36. The maximum pixel value of the Y-probe image 530 is 42. Both images 510 and 530 are low light images because the maximum pixel value of each image is much less than the gray scale range for the images, which, in this case, is $2^8$ or 255.

The difficulty in segmenting both images 510 and 530 using a single gray scale threshold value is clear. If the gray scale threshold value is set to, for example, 60 in order to separate the X-probe signal from the artifact signal in the X-probe image, the Y-probe signal will not be detected because its pixel value is less than the gray scale threshold value of 60. If, on the other hand, the gray scale threshold value is set to a value around 30 in order to pick out the Y-probe signal, both the X-probe signal and the artifact will be segmented in the X-probe image. In order to select the Y-probe signal and reject the artifact, the threshold must be set to a very narrow range between 36 and 42. Setting the threshold to such a narrow range makes the segmentation process susceptible to many errors if the image quality is changed slightly. Unless the gray scale threshold is adjusted for each image, segmentation errors such as the ones described above are likely to occur. Adjusting the threshold value for each image, either manually or automatically, will, however, reduce the throughput rate of the sampling system.

The X-probe fractal map 515 and the Y-probe fractal map 535 shown in FIG. 5 are generated from their respective images structuring elements of size 3 and 255. The images were not histogram equalized nor gamma corrected prior to generating the fractal maps. The fractal dimensions of e pixels, d, corresponding to the corresponding pixels in gray scale image are shown in FIG. 5. The fractal dimension of the X-probe pixel is 2.41, the artifact has a fractal dimension of 2.21, and the fractal dimension of the Y-probe pixel is 2.41. In comparing fractal maps 515 and 535, it appears that the fractal transformation tends to equalize the dominant signal across each image and separate the dominant signal from a subordinate signal within each image. In this example, a single fractal threshold may be used to segment both the X-probe and Y-probe signals from the rest of their respective fractal maps. The apparent ability of the fractal transformation to assign the brightest or dominant signal roughly the same value regardless of image quality reduces the need to dynamically adjust threshold values for each image or to generate consistent, high quality images for an entire sample batch.

In another embodiment of the present invention, an automated method for identifying male fetal cells in maternal blood is now described. A sample of maternal blood is prepared by staining the nuclear material with a dye such as DAPI following procedures known to one of skill in the art. The sample is also tagged with FISH probes targeted to the X and Y-chromosomes. High magnification (about 100×) images of a portion of the prepared sample are captured by a monochrome camera after passing through a filter that passes one of the probe signals through to the camera. The images captured through the X-probe filter are hereinafter referred to as the X-images. Similarly, the images captured through the robe filter are hereinafter referred to as the Y-images. For each portion of the sample, n images, each taken at a different focal distance, are captured and stored. The number, n, is selected to ensure that the probe lies in the focal plane of one of the n images and depends on the depth of field of the objective used to capture the image and the expected thickness of the sample. As an illustrative example, if the objective has a depth of field about 0.8 pm and the estimated sample thickness is about 7 μm, a set, or stack of n=9 images should be sufficient to ensure that the probe lies in the plane of at least one of the images in the stack.

Figure 6:
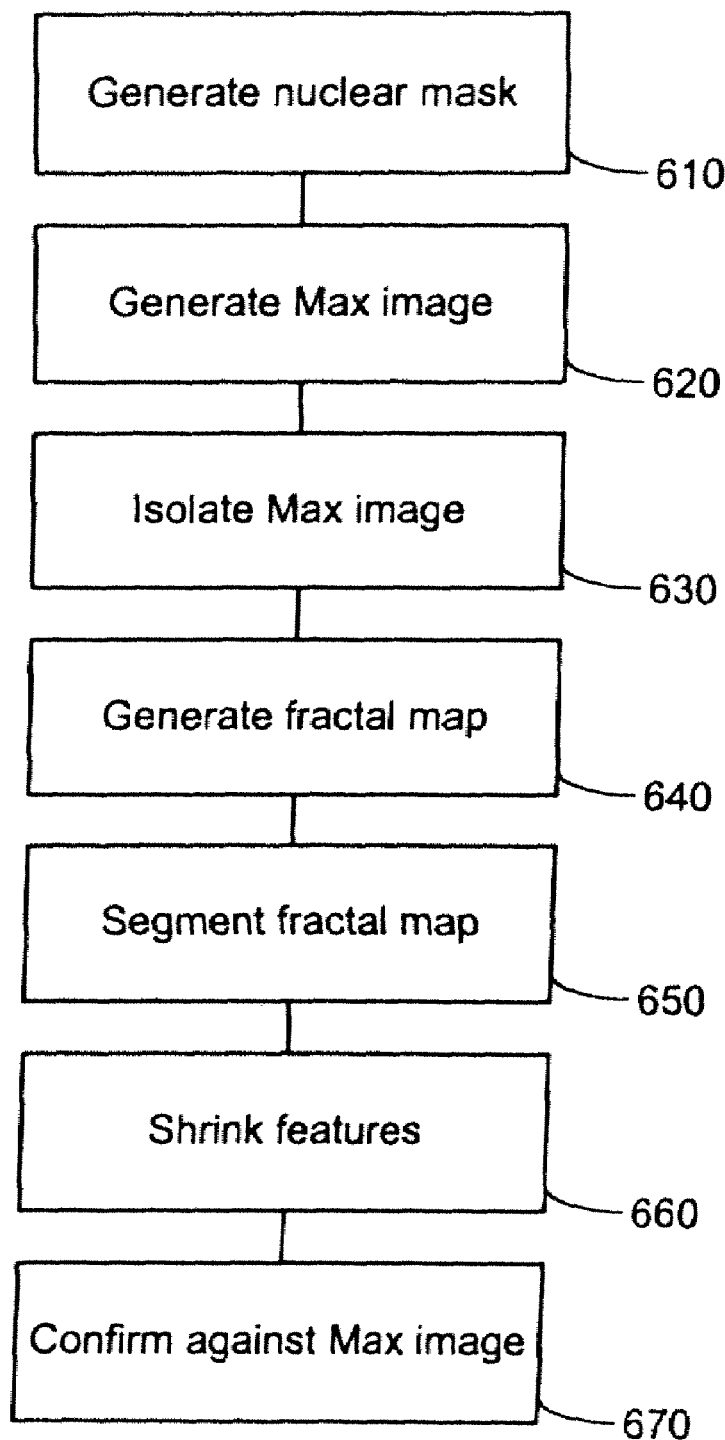
FIG. 6 is a flowchart of another embodiment of the present invention.

FIG. 6 is a flowchart illustrating the method of identifying male fetal cells in maternal blood. Although the description below is limited to a single image stack, it is understood that the flowchart in FIG. 6 is followed for both the X-image stack and the Y-image stack.

A binary mask isolating the nucleus from the rest of the image is created in step 610. The mask is created by thresholding the DAPI signal followed by a closing operation. The threshold value is preferably set to between 1.2-2.0 times the background and most preferably set to between 1.4-1.6 times the background.

A composite image, referred to as the Max image, is generated in step 620. The pixel value for each pixel in the Max image is the maximum of the corresponding pixel values among the n images in the image stack, i. e., $$Max(x,y)=MAX\{X1(x,y), X2(x,y), \ldots Xn(x,y)\} \quad (4)$$

where Max(x, y) is the pixel value at the location (x, y) in the Max image, Xi(x, y) is the pixel value at the location (x, y) in the i-th image of the image stack, and MAX {argument list} is the maximum function returning the largest value in the argument list.

The objects external to the nucleus are eliminated in step 630 by performing an AND operation with the binary mask created in step 610 and the Max image generated in step 620.

A fractal map of the image created in step 630 is generated in step 640 following the procedure described above. In an alternative embodiment, the fractal map is generated directly from the Max image. The fractal dimension for a pixel is estimated by centering a $L_1 \times L_1$, structuring element on the pixel and summing the pixel values of the pixels within the structuring element to form a first sum, $N_1$. A second structuring element of size $L_2 \times L_2$, where $L_2 > L_1$, is centered on the pixel and a second sum, $N_2$, of the pixel values of the pixels within the second structuring element is calculated. The fractal dimension of the pixel is estimated using the equation $$d_p = \frac{\log(N_2/N_1)}{\log(L_2/L_1)} \quad (5)$$

where $d_p$, is the fractal dimension of the pixel in the Max image, $N_2$ is the sum of the pixel values in the $L_2 \times L_2$ structuring element, $N_1$ is the sum of the pixel values in the $L_1 \times L_1$ structuring element, and $L_2$ and $L_1$ are the sizes (in pixels) of the respective structuring elements.

In one embodiment, $L_1$ may be chosen from the group consisting of 1, 2, 3, 4, 5, and greater than 5. In a preferred embodiment, $L_1$ is set to $L_1=3$. $L_1$ is selected such that $L_2$ is greater than $L_1$ or, stated differently, the ratio, $R=L_2/L_1>1$. In one embodiment, R is in the range selected from a group consisting of 1-16, 16-64, 64-128, and greater than 128. In a preferred embodiment, R=10.

The fractal map is segmented in step 650 by thresholding. In one embodiment, a single threshold value may be used to segment the fractal map. In a preferred embodiment, two segmented images are generated from the fractal map using a first threshold value to generate a first segmented fractal image and a second threshold value to generate a second segmented fractal image. The threshold values are preferably set by an operator before the automated analysis of the sample run. The threshold value may be optionally adjusted automatically during the automated run to compensate for sample-to-sample variations.

Objects in the segmented fractal images are shrunk to points in step 660. The shrinking operation is repeated applied to the segmented fractal image until the target objects are single pixels, referred to hereinafter as dots. Alternatively, the shrinking operation may be repeated S times where S is a predetermined number that depends on the object size and desired throughput rate.

The dots remaining after the shrinkage operation 660 should correspond to the probe signals in the Max image. As a check, the dots in the segmented fractal image are compared to the corresponding location in the Max image in step 670. If the dots represent true probe signals, the pixel value of the corresponding pixel in the Max image should be one of the largest pixel values in the Max image.

Figure 7:
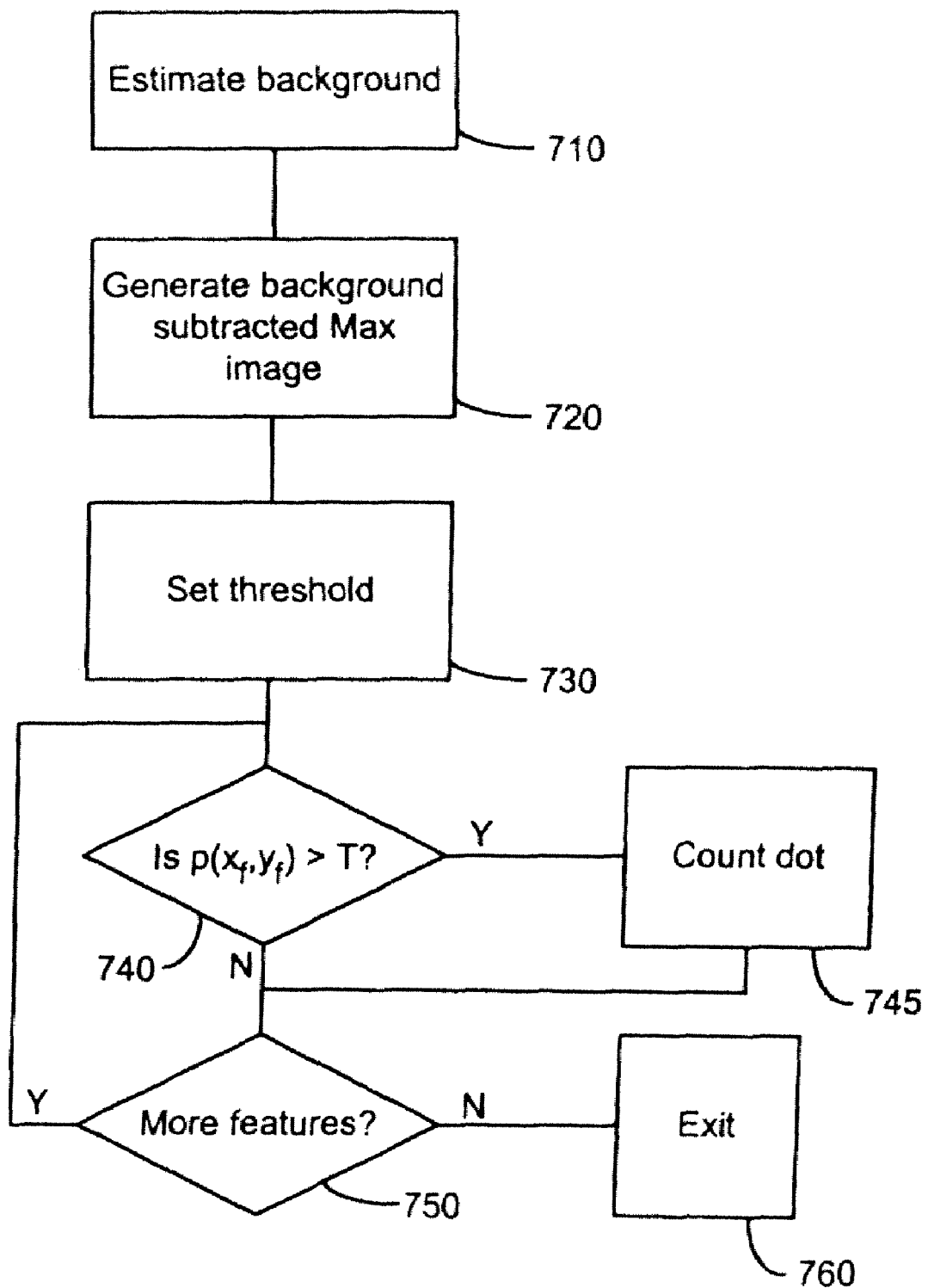
FIG. 7 is a flowchart of the confirmation method of the embodiment shown in FIG. 6.

FIG. 7 is a flowchart illustrating the details of the confirmation check of step 670. In FIG. 7, the Max image is corrected for background before comparison to the segmented fractal map. The background of the Max image is estimated in step 710. In a preferred embodiment, a first minimum pixel value from a first set of pixels is compared to a second minimum pixel value from a second set of pixels and the greater of the first or second minimum pixel value is selected as the background, b. In a preferred embodiment, the first set of pixels forms a line across the Max image. Similarly, the second set of pixels forms a second line across the Max image. In a preferred embodiment, the first and second lines intersect at or near the center of the Max image. In another embodiment, the first line is a vertical line through the center of the Max image and the second line is a horizontal line through the center of the Max image.

The background adjusted Max image, Mb, is generated in 720 by setting pixels in the Max image having a pixel value that is less than twice the background estimated in step 710 to zero as shown in equation 6:

$$p_b(x, y) = \begin{cases} p(x, y) & p(x, y) > 2*b \\ 0 & \text{otherwise} \end{cases} \quad (6)$$

where $p_b(x,y)$ is the pixel value at location (x,y) in the Mb image, p(x,y) is the pixel value at location (x,y) in the Max image, and b is the background.

A threshold for $M_b$ is set in step 730. In a preferred embodiment, a histogram is generated for $M_b$. Starting at the bin containing the darkest or lowest pixel value, one or more bins are examined for a non-zero value. A bin containing a zero value indicates that no pixels in $M_b$ have a pixel value represented by the bin. Conversely, a bin containing a non-zero value indicates that there is at least one pixel in $M_b$ having a pixel value represented by that bin. The bins are sequentially searched until the first non-zero value is found. The pixel value represented by the bin with the first non-zero value is added to an offset and the sum is set as the threshold, T.

The offset may be determined and set by an operator before a run. The offset will depend on the quality of the images in the run but may be easily determined empirically by one of skill in the art. As an illustrative example, gray scale images 510, 530 of FIG. 5 are low quality in that the maximum pixel value is less than 100. An offset in the range of 5-20 may be appropriate for such images. In contrast, a larger offset value may be used for higher quality images.

In step 740, the objects (dots) identified in the fractal map are checked to confirm the existence of corresponding objects in $M_b$. The pixel value of Max pixel corresponding to the location, ($x_f$, $y_f$), where an object was detected in the fractal map is compared to the threshold, T, i. e., $$p_b(x_f,y_f)>T \quad (7)$$

where $p_b(x_f, y_f)$ is the pixel value of the Mb pixel at location ($x_f$, $y_f$) and $x_f$ and $y_f$ are the x and y coordinates of the object detected in the fractal map.

If the Max pixel is not greater than the threshold, the object is considered to be a false signal and is not counted. If, on the other hand, the Max pixel is greater than T; the object is recognized as a true signal and is counted in step 745 by incrementing a count value.

In step 750, a check is made to verify that all detected objects in the fractal map have been compared to its corresponding Max image pixel value. If all objects have been compared, the process exits in step 760. If there are remaining objects, the process returns to step 740 using the location of the remaining object.

Count step 745 may store the count value for latter processing. In an alternative embodiment, the count value may be compared to an expected value and an error flag set if the count value exceeds the expected value. As an illustrative example, if only one probe signal is expected per nucleus, the expected value may be set to 1. As another illustrative example, if the probe signal represents the Y chromosome, the number of expected signals is either 0 (for female) or 1 (for male). The expected value may be set to 1 because a count of 2 would represent a genetic abnormality or a false positive. In either situation, the image could be flagged for further analysis by an operator.

Having described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. An apparatus for discriminating objects in a digital image comprising:
 an automated scanning optical microscopy system;
 a digital camera attached to said automated scanning optical microscopy system and configured to capture said digital image of field of view of said microscopy system;
 an image processor configured to receive said digital image from said digital camera and to perform the steps of:
  automatically assigning to each pixel in the digital image a pixel value that represents the fractal dimension of the pixel to generate a fractal map;
  segmenting the fractal map into two or more fractal images; and
  shrinking objects in the segmented fractal images.

* * * * *